United States Patent [19]

Wagner et al.

[11] 3,843,696

[45] Oct. 22, 1974

[54] METHADONE ANALOG COMPOUNDS

[75] Inventors: Daniel Wagner, Palo Alto; Edwin F. Ullman, Atherton, both of Calif.

[73] Assignee: Syva Company, Palo Alto, Calif.

[22] Filed: Sept. 5, 1972

[21] Appl. No.: 286,519

[52] U.S. Cl. ......... 260/404, 260/112 R, 260/112 B, 260/112.5, 260/293.76, 260/326.47, 260/463, 260/570.8 K, 424/12
[51] Int. Cl. .............................................. C11c 3/00
[58] Field of Search .................................... 260/404

[56] References Cited
UNITED STATES PATENTS
3,754,021 8/1973 Shen et al. ..................... 260/518 R

*Primary Examiner*—Lorraine A. Weinberger
*Assistant Examiner*—L. A. Thaxton

[57] ABSTRACT

Methadone derivatives are provided for use in preparing reagents for immunoassays and for preparing antibodies to methadone. A carboxy group is bonded through an aliphatic chain to a group which conforms to a substantial portion of methadone. Accurate and selective immunoassays are obtained by employing a modified methadone derivatized detector with the antibodies prepared to the methadone analog.

4 Claims, No Drawings

METHADONE ANALOG COMPOUNDS

BACKGROUND OF THE INVENTION

1. Field of the Invention

Immunoassays have been finding wide application for assaying for physiologically active materials. By employing naturally occurring receptors, one is frequently capable of assaying for a class of compounds, a small group of compounds, and in many instances, a single compound, where a number of other compounds may be present of similar and/or dissimilar structure. Among the most popular naturally occurring receptors for immunoassays are antibodies. Since a large number of compounds which are of interest for assaying are not antigenic, but rather haptenic, it is usually necessary to modify the compound of interest, so as to be able to bond the compound to an antigenic protein. The hapten modified protein may then be introduced into an animal for production of antibodies to the hapten.

In modifying the hapten to introduce an active functionality, one must consider a wide variety of potential problems. The modification of the hapten must occur in such a way that antibodies which are formed will recognize the hapten itself. In addition, it may or may not be desirable that the antibody recognize one or more metabolites of the hapten. Also, where the assay is performed by causing a competition for antibody sites between the naturally occurring hapten and a hapten bonded to a detector, it is essential that the bridging group between the hapten and the detector allow for binding to the antibody in competition with the naturally occurring hapten.

The group introduced must permit formation of antibodies to the free hapten. The bridging group should be capable of being activated, so as to be active with both proteins and, where employed, the detector. It is often preferable to employ the same linking group for bonding to the protein antigen, that is employed for formation of the antibody, as is employed for bonding to the detector.

Also, the modified hapten when joined to a detector should provide a product which is soluble in the assay medium at the concentrations employed. Because aqueous solvents are employed and the haptens and/or the detectors are frequently hydrophobic, the bridging group usually should be devised so as not to greatly enhance the lipophilicity of the product.

2. Description of the Prior Art

Copending application Ser. No. 143,609, filed May 14, 1971 now abandoned, describes a method for immunoassays employing enzymes as the detector. Copending application Ser. No. 141,516 now abandoned, filed May 10, 1971, describes the method of immunoassays employing stable free radicals as the detector. M. M. Baiser, Bull. of Narcotics, 1953, 32, in an article entitled Methadone Chemistry, describes the method of synthesis for methadone.

SUMMARY OF THE INVENTION 2,2-Diphenyl-4-dimethylaminopentanoyl substituted aliphatic carboxylic acids are used in the preparation of derivatives for preparing antibodies and for joining with detector systems to be used in immunoassays for methadone. Detecting systems of special interest are enzymes and stable free radicals.

DESCRIPTION OF THE SPECIFIC EMBODIMENTS

The subject compositions are 2,2-diphenyl-4-dimethylaminopentanoyl substituted aliphatic carboxylic acids and derivatives of such carboxylic acids, such as the mixed anhydride with carbonates, esters and a wide variety of amides. Included among the amides are those derived from synthetic or naturally occurring polypeptides. The subject compounds are useful for derivatizing detector molecules having amino groups, such as enzymes and nitroxide amines.

The amides, depending upon the group bonded to the amide nitrogen atom, find use in preparation of antibodies to methadone, and as reagents in the carrying out of immunoassays for the determination of methadone. In preparing antibodies to methadone, an activated derivative of the aforementioned carboxylic acid is combined with an antigenic substance, normally a polypeptide or protein, to provide at least one methadone derivative bound to the antigenic substance. The resulting product is then introduced into an animal to initiate antibody formation to methadone. By following known techniques the antibodies or γ-globulins are harvested and may be subjected to further treatment, as required.

The compounds of this invention and derivatives thereof will for the most part have the following formula:

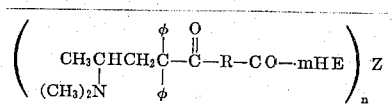

wherein R is a divalent aliphatic group of from 4 to 10 carbon atoms and 0 to 1 heteroatoms (O, N, with N being bonded solely to carbon) other than terminal, usually aliphatic hydrocarbon (hereinafter referred to as "aliylene") of from 4 to 6 carbon atoms, which may be straight chain or branched chain, usually straight chain, or if branched having not more than two branches, usually methyl, and has from 0-1 site of aliphatic unsaturation, usually ethylenic, there being at least four carbon atoms between the two carbonyl groups; and Z is hydroxyl, nitrophenyl, alkyl carbonate ($OCO_2R^1$ wherein $R^1$ is alkyl of from 1 to 6 carbon atoms, more usually 1 to 4 carbon atoms), —Y, wherein Y is a polypeptide residue (including polypeptide subunits of proteins) and —NH—X, wherein X is a stable free radical group, usually nitroxide, and more usually cyclic nitroxide. $n$ is one except when Z is —Y, when $n$ will be equal to the number of acyl groups bonded to the amino groups of Z and will be at least 1 and not greater than the number of amino functional groups available for bonding, usually not more than the molecular weight of Z divided by 500, more usually not more than the molecular weight divided by 1,500; m is 0 or 1; and E is an anion of a mineral acid, e.g., $Cl^-$, $Br^-$; $HSO_4^-$, etc.

The carboxylic acid (Z=OH) will for the most part have the following formula:

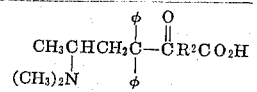

wherein $R^2$ is a divalent aliphatic group having 0 to 1 heteroatoms (O,N) of from 4 to 10 carbon atoms, more usually aliylene of from 4 to 6 carbon atoms, having from 0–1 site of aliphatic unsaturation, usually ethylenic, and may be straight chain or branched chain, preferably straight chain, there being at least 4 carbon atoms between the two carbonyl groups. Usually a heteroatom will be separated from a carbonyl group by at least 2 carbon atoms.

Illustrative groups for $R^2$ are tetramethylene, pentamethylene, hexamethylene, octamethylene, 3,3-dimethylpentylene, 2-methylhexylene, 3-oxapentylene, N-methyl 3-azapentylene, etc.

Usually the two valences of $R^2$ will be alpha-omega, the terminal carbon atoms being primary.

The mixed anhydride which finds use in this invention will have the following formula:

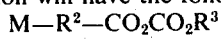

wherein M has the formula:

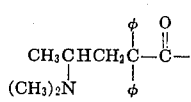

$R^2$ is as defined previously; and
$R^3$ is alkyl of from 1–6 carbon atoms, more usually of from 2–4 carbon atoms, e.g. ethyl, isopropyl, butyl and hexyl.

Of particular interest are compounds where the carboxyl group is bonded to an amino group, which is part of a polypeptide or protein structure. One group of polypeptides and proteins is antigenic, so that by bonding the carboxyl modified methadone to the polypeptide or protein, antibodies can be formed to methadone. A narrower class of proteins, which also can be used as antigens, but will not normally be used as such, are enzymes which are employed as the detector in an immunoassay system. As antigens, inactive enzymes can be used.

Polypeptides usually encompass from about 2 to 100 amino acid units (usually less than about 12,000 molecular weight). Larger polypeptides are arbitrarily called proteins. Proteins are usually composed of from 1 to 20 polypeptide chains, called subunits, which are associated by covalent or non-covalent bonds. Subunits are normally of from about 100 to 300 amino acid groups (or 10,000 to 35,000 molecular weight). For the purposes of this invention, polypeptide is intended to include individual polypeptide units and polypeptides which are subunits of proteins, whether composed solely of polypeptide units or polypeptide units in combination with other functional groups, such as porphyrins, as in haemoglobin or cytochrome oxidase.

The number of methadone groups will vary depending on whether the polypeptide is an enzyme or antigen. The maximum number of groups will be limited by the effect of substitution on solubility, activity and the like. For the formation of antibodies, a sufficient number of methadone groups should be present, so as to provide a satisfactory harvest of antibodies to methadone. Otherwise, the proportion of antibodies to methadone as compared to other protein may be undesirably low.

The first group of protein materials or polypeptides which will be considered are the antigenic polypeptides. These may be joined to the non-oxocarbonyl group of the carboxy modified methadone through an amino group. The amide product can be used for the formation of antibodies to methadone. The protein materials which may be used will vary widely, and will normally be from 1,000 to 10 million molecular weight, more usually 25,000 to 500,000 molecular weight.

With the antigens, there will be no more than one methadone group per 500, more usually 1,000 molecular weight, generally no more than one methadone group per 2,000 molecular weight and not less than one methadone group per 500,000 molecular weight, usually not less than one methadone group per 50,000 molecular weight. With intermediate molecular weight antigens, those having molecular weights in the range of 50,000 to 1,000,000 the number of methadone groups will generally be from about 2 to 250, usually from 4 to 100. Low molecular weight antigens (1,000 to 5,000 molecular weight) may have 1 to 10, usually 2 to 5 methadone groups so that there may frequently be as many as one methadone group per 500 molecular weight.

Enzymes will normally be of molecular weights in the range of about 10,000 to 600,000, usually in the range of about 12,000 to 150,000, and more usually in the range of 12,000 to 80,000. Some enzymes will have a plurality of enzyme subunits. It is intended when speaking of enzyme molecular weights to refer to the entire enzyme. There will be on the average at least about one methadone per enzyme, usually at least about two methadones per enzyme, when the labelling is not limited to a specific amino group, and rarely more than 40 methadones per enzyme, usually not more than 35 methadones per enzyme. For example, with lysozyme the average number of methadone groups will be in the range of about 2 to 4. With malate dehydrogenase, the average number of methadones will be from 4 to 35. Specific labelling techniques can be used to introduce one methadone per enzyme.

While the methadone may be bonded through the carboxyl group to hydroxyl or mercapto groups, which are present in the proteins, for the most part the bonding will be to amino. Therefore, the compounds are described as amides, although esters and thioesters may also be present.

Amino acids present in proteins which have free amino groups for bonding to the carboxy modified methadone include lysine, arginine, ornithine, etc. The hydroxyl and mercaptan containing amino acids include serine, cysteine, and threonine.

Various protein and polypeptide types may be employed as the antigenic material. These types include albumins, enzymes, serum proteins, e.g. globulins, ocular lens proteins, lipoproteins, etc. Illustrative proteins include bovine serum albumin, keyhole limpet hemocyanin, egg albumin, bovine gamma-globulin, etc. Small neutral polypeptides which are immunogenic such as gramicidins may also be employed. Various synthetic polypeptides may be employed, such as polymers of lysine, glutamic acid, phenylalanine, tyrosine, etc., either by themselves or in combination. Of particular interest is polylysine or a combination of lysine and glutamic acid. Any synthetic polypeptide must contain a sufficient number of free amino groups, as for example, provided by lysine.

The second group of protein molecules are the detectors. These are the enzymes to which the carboxy modified methadone may be conjugated. As indicated, the methadone modified enzyme is useful for immunoassays. A description of the immunoassay technique will follow.

Various anzymes may be used, such as peptidases, esterases, amidases, phosphorylases, carbohydrases, oxidases, and the like. Of particular interest are such enzymes as lysozyme, peroxidase, α-amylase, dehydrogenases, particularly malate dehydrogenase, alkaline phosphatase, β-glucuronidase, cellulase and phospholipase, particularly phospholipase C.

The substituted proteins will for the most part have the following formula:

$(M-R^2-CO-)_{n'}$ Y' wherein Y' is a polypeptide residue;
M and $R_2$ have been defined previously; and
$n'$ is a number of at least 1.

$n'$ will usually be of from 1 to 50, more usually from 2 to 35, when Y' is an enzyme residue. When Y' is an antigenic protein residue, $n'$ will usually range from the molecular weight of the protein divided by about 1,500 to about 50,000. For small polypeptides, $n'$ will usually range from 1 to the molecular weight of the polypeptide divided by 500.

Instead of an enzyme a stable free radical may be employed as the functionality for detection in the immunoassay. The stable free radicals are cyclic nitroxides having the nitrogen of the nitroxide as an annular member and from 0 to 1 other hetero atoms, i.e., oxygen and nitrogen, as annular members. The molecules bonded to the non-oxo carbonyl of the methadone will normally be from 7 to 16 carbon atoms, more usually from 7 to 12 carbon atoms. The amino functionality may be bonded directly to the annular carbon atom or may be bonded to the ring through an aliphatic chain of from 1 to 4 carbon atoms, more usually of from 1 to 2 carbon atoms. The molecules may have from 0 to 2 sites of ethylenic unsaturation, more usually from 0–1 site of ethylenic unsaturation.

For the most part, the stable nitroxide functionalities bonded to the carboxyl carbonyl of the carboxyl modified methadone will have the following formula:

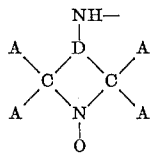

wherein D is a divalent aliphatic radical, usually aliphatically saturated, of from 1–6 carbon atoms, more usually of from 1–3 carbon atoms, only from 1–3, usually 2–3, of the carbon atoms in D being annular atoms; and A is lower alkyl (1–6, usually 1–3 carbon atoms), particularly methyl.

For the most part, compounds are pyrrolidine or piperdine derivatives, and D is hydrocarbon.

In forming the various amide products which find use in the subject invention, the carboxylic acid will normally be activated. This can be achieved in a number of ways. Two ways of particular interest are the reaction with a carbodiimide, usually a water soluble dialiphatic or dicycloaliphatic carbodiimide, in an inert polar solvent, e.g. dimethylformamide, acetonitrile and hexamethylphosphoramide. The reaction is carried out by bringing the various reagents together under mild conditions and allowing sufficient time for the reaction to occur.

A second method is to form a mixed anhydride employing an alkyl chloroformate, e.g. isobutyl chloroformate. The mixed anhydride is formed by combining the carboxy substituted methadone, the alkyl chloroformate and a tertiary amine. The temperature is normally below ambient temperature. The mixture is then combined with the amino compound to be conjugated and the reaction allowed to proceed under mild conditions.

At least a stoichiometric amount of the chloroformate is employed based on the methadone, and usually an excess. The excess does not usually exceed three times stoichiometric. The tertiary amine is present in at least equimolar amounts to the chloroformate.

Also, esters of methadone can be employed which are operative in water for acylating amine functions. An illustrative hydroxylic group is p-nitrophenol which can be used to prepare the p-nitrophenyl ester.

The following examples are offered by way of illustration and not by way of limitation.

(All temperatures not indicated are in Centigrade).

EXAMPLE I

Preparation of 7,7-diphenyl-6-keto-9-dimethylaminodecanoic acid hydrochloride

A solution of tetramethylene bromide (32.4 g, 150 mmoles) in dry ether (150 ml) was added to magnesium (10.9 g, 450 mmoles) in ether (80 ml) at such a rate that the ether refluxed. The reaction was carried out under argon. After the addition was completed, the reaction mixture was boiled for one hour. A solution of 2,2-diphenyl-4-dimethylaminopentanonitrile, [prepared according to J. W. CUSIC, J. Am. Chem. Soc., 71 (1949) 3,546] (8.4 g, 30 mmoles) in dry xylene (100 ml) was added during 30 min. at room temp., and the mixture was stirred at 55° for 1 hour. The reaction mixture was cooled in ice-water bath and $CO_2$ was passed through it with fast stirring for 4 hrs. Water (200 ml) and concentrated HCl (100 ml) were added, the magnesium was filtered-off, and the filtrate was boiled under reflux for 2 hours. The cooled, clear solution was washed with ether (3 × 150 ml) and extracted with dichloromethane (3 × 140 ml). This extract was evaporated to dryness, and the residue dissolved in 0.5 liter of 0.5N sodium hydroxide.

This solution was washed with ether (3 × 100 ml), made acidic with conc. HCl (150 ml), saturated with sodium chloride and extracted with dichloromethane (3 × 200 ml). Evaporation of the solvent left an oil (7.55 g, 60 percent) which ran as a single spot on TLC (HCCl$_3$:MeOH 8:2 and 7:3) $\lambda_{max}^{0.02\% \, CF_3COOH}$ 293 nm ($\epsilon$ =540);
264 nm ($\epsilon$ =500);
259 nm ($\epsilon$ =535).

EXAMPLE II

Conjugation of Methadone-acid to Bovine Serum Albumin (BSA)

Methadone-acid (Example I) (0.63 g, 1.5 mmoles) and Et₃N(0.63 ml, 4.5 mmoles) were dissolved in dry DMF (5 ml) at −8°. Isobutyl chloroformate (0.19 ml) was added and the mixture was kept at −8° for one-half hour and at 0° for another one-half hour. The solution of the mixed anhydride thus obtained was added dropwise to a solution of BSA (1.4 g, 1.07 meqv.) in a mixture of water (200 ml), methanol (110 ml), and sodium bicarbonate (9.2 g), at 0°. The mixture was stirred at 0° for 18 hours, dialyzed (18 hours, constant flow of dist. water) and lyophilized. Yield of the conjugate: 1.2 g. The degree of conjugation was found from the UV spectrum of the conjugate (using a calibration-curve) to be about 50 percent (35 methadone molecules per BSA).

The calibration-curve was obtained as follows: The ratio of the absorptions at 300/(280–300) nm was plotted against the known concentrations of BSA and methadone-acid in several solutions. The accuracy of this calibration curve was checked by calculating the relative concentrations of methadone-acid and BSA in the above solutions from their UV spectra, and plotting these values against the same absorption ratio. The same curve was obtained.

For the calculation, the following set of formulas was used:

[Methadone-acid] = [$(\epsilon_{BSA}^{280})(A^{300}) - (\epsilon_{BSA}^{300})(A^{280})$]/[$(\epsilon_{BSA}^{280})(\epsilon_{met.}^{300}) - (\epsilon_{BSA}^{300})(\epsilon_{met.}^{280})$]

[BSA] = [$(\epsilon_{met.}^{300})(A^{280}) - (\epsilon_{met.}^{280})(A^{300})$]/[$(\epsilon_{BSA}^{280})(\epsilon_{met.}^{300}) - (\epsilon_{BSA}^{300})(\epsilon_{met.}^{280})$]

The experimental values were:
$\epsilon_{BSA}^{280} = 4.5 \times 10^4$
$\epsilon_{BSA}^{300} = 3.8 \times 10^3$
$\epsilon_{met.}^{280} = 4 \times 10^2$
$\epsilon_{met.}^{300} = 5 \times 10^2$
(met. — methadone acid)

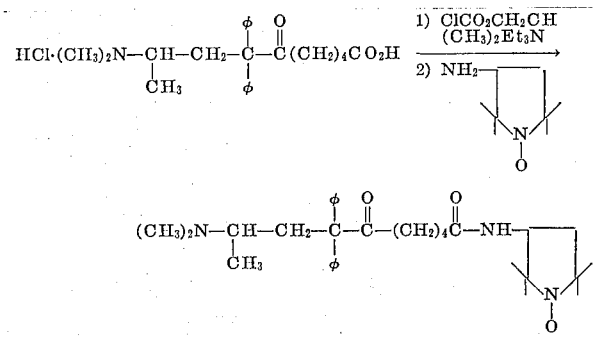

EXAMPLE III

N-(3'-[1-oxyl-2,2,5,5-tetramethylpyrrolidinyl]) 7,7-diphenyl-6-keto-9-dimethylaminodecanamide Methadone-carboxylic acid (Example I) (1.170 g, 2.8 mmoles) and Et₃N (243 μl) were dissolved in dry DMF (5 ml), cooled to 0° and treated with isobutyl chloroformate (393 μl) with stirring under N₂ for 1 hour. 3-Amino-2,2,5,5-tetramethylpyrrolidin-1-oxyl (450 mg) was added and the reaction mixture was stirred at room temperature overnight, poured into 5 percent aq. Na₂CO₃ (40 ml) and extracted with ether (3 × 20 ml). The ether solution was washed with water (2 × 10 ml) and with 10 percent aq. NaCl solution (2 × 10 ml). Evaporation of the ether left a red oil which was purified by chromatography on silica gel (HCCl₃; Et₂O; [50:50 Et₂O:acetone]) to give an oil which solidified on standing (900 mg, 62 percent).

Anal. calc. for $C_{32}H_{46}N_3O_3$: C, 73.80; H, 8,90; N, 8.06. Found: C, 73.27; H, 8.86; N, 7.98.

EXAMPLE IV

Conjugation of Methadone-Carboxylic Acid and Lysozyme

A. Preparation of the Mixed Anhydride. The acid of Example I, (21.0 mg, 50 μmoles) was dissolved in 1 ml dry DMF, two drops of triethylamine were added, and the chilled solution was treated with 6.5 μl of isobutylchloroformate. See Example II.

B. Reaction of the Mixed Anhydride with Lysozyme. Lysozyme, (120 mg) (50 μmoles of lysine) was dissolved in 12 ml of water. The pH was adjusted to 10.0 with 0.05 N NaOH and maintained there during the dropwise addition of the mixed anhydride solution. After 30 minutes additional stirring, the mixture was centrifuged. The pellet (containing only a small fraction of the enzyme) was dissolved in 4 ml of 8 M urea. It remained soluble during dialysis against water. The resulting solution proved quite dilute and the ΔOD/-time in the assay was grossly non-linear. The supernatant fraction stayed homogeneous through dialysis against water, and proved to be very high quality product as judged from its usefulness in the assay.

In order to carry out the various assays, antibodies are prepared. The following is an illustrative procedure for preparing antibodies to the methadone conjugate to protein.

Antiserum may be obtained as follows:

The antigen of Example II is dissolved in a saline solution (9 g/liter) at a 2 mg/milliliter concentration. Per 1 ml aliquot of the above solution introduced, there is introduced simultaneously 3 ml of Complete Freund's Adjuvant in homogenized form by means of a two-way needle. For subcutaneous injections, approximately 0.3 ml (antigen plus Freund's solution) is injected per site and for intraperitonealy injections, approximately 0.4 ml is injected. A total dosage is about 4.0 ml per rabbit.

After 3–4 weeks, a booster shot is given intramuscularly consisting of 0.5 ml of the above saline solution and 0.5 ml of Complete Freund's Adjuvant. A period of 5–7 days is allowed to pass and the rabbit is bled by heart puncture.

When the desired amount of blood is collected, the blood is allowed to clot and the clot is removed. The remaining solution is then centrifuged at 2,000 r.p.m. for 10 minutes. The serum is collected free of loose red cells.

An equal volume of saturated ammonium sulfate solution is added to the serum dropwise with stirring at 4° C. After standing for an hour at that temperature, the solution is centrifuged at 10,000 r.p.m. for 15 minutes and the supernatant removed. The residue is suspended in as small a volume as possible of 1 × PBS (phosphate buffered saline, see below for description), transferred to a dialysis bag and dialyzed overnight against 1 × PBS, pH 7.0. The residue in the dialysis bag is then isolated and frozen.

(To make 1 liter of 10 × PBS combine 76.5 g NaCl, 7.25 g Na$_2$HPO$_4$anh, 2.12 g of potassium diacid phosphate and 10.0 g NaN$_3$; make up to one l. with distilled water, and adjust to 6.5 with in HCl. The 1 × PBS is obtained by diluting 10 × (10 fold), the pH changing to 7.0–7.1 as a result of dilution).

In order to carry out an assay, a goat was immunized with 30 mg of the conjugate of Example II in 5 ml saline/15 ml Complete Freund's Adjuvant. Every four weeks a recall injection was given with the same amount of material and incomplete Freund's Adjuvant. The formation of antibodies was monitored and the animal bled before injection. The antibodies were harvested according to known procedures.

The enzyme assay is carried out by preparing a number of reagent solutions.

a. Buffered solution: Tris-Maleate 0.0.25 M pH 6.0.

b. Bovine Serum Albumin Solution: 0.1% BSA in Tris-Maleate prepared above.

c. Bacteria: 40 mg of Micrococcus lysodeikticus was suspended in 50 ml buffer solution. The suspension should be prepared daily, 12 hours before use and stored at 4° C.

d. Methadone-Lysozyme: The stock solution of the methadone conjugated with lysozyme is diluted with 0.1% BSA and Tris-Maleate and stored.

The active lysozyme content of the working solution is determined by measuring at 436nm the rate of bacterial lysis at 30°. The assay solution is prepared by mixing 0.2 ml bacteria, 0.02 ml 0.1% BSA-buffer, 0.08 ml synthetic urine and 0.50 ml of the lysozyme solution.

Methadone antibody is supplied in 0.025 molar Tris-Maleate (pH 7.4) at a concentration suitable for 20 λ to inhibit 92–96 percent of the methadone-lysozyme activity of the stock enzyme solution.

To prepare the synthetic urine, 5.2 g potassium chloride, 8.2 g sodium chloride, 1.4 g sodium dihydrogen phosphate, 1.4 g disodium monohydrogen Phosphate and 11 g of urea are combined.

In carrying out the assay, 20λ of the antibody solution is added to 0.2 ml of the bacterial suspension. To this solution is added 80λ or urine and the mixture diluted with one-half ml of the enzyme solution. The mixture is then aspirated into the spectrometer and the decrease in optical density is measured at 435 nm for 40 seconds. The concentration of methadone in the urine sample is read from a standard curve prepared by using standardized solutions and taking readings.

The following table indicates properties of the various reagents and the specific amounts present:

TABLE I

| General Data | |
|---|---|
| Methadone-lysozyme (stock) | $1.6 \times 10^{-5}$M |
| Antibody (stock) Goat 17B | $3.66 \times 10^{-5}$M (binding site) |
| Binding Constant | $6.55 \times 10^{7}$ |
| Assay Data | |
| [Enzyme] | $2 \times 10^{-7}$M |
| [Antibody] | $2.3 \times 10^{-7}$M (binding site) |
| Moles Enzyme | $1.6 \times 10^{-10}$ |
| Moles Antibody | $1.84 \times 10^{-10}$ |
| Time for Assay | 40 seconds |
| Sensitivity to Methadone | $1 \times 10^{-6}$ (0.35 µg/ml) |

Employing the spin labeled methadone, the assay is carried out as follows: Two plastic cups are employed, one cup containing 5 µl of 0.2 M sodium dichromate and the second 5 µl of borate buffered antibody at pH 8. Sufficient buffer is present in the antibody solution to provide a final concentration of 0.18 M. To the dichromate is added 50 µl of sample and a 20 µl aliquot is transferred from the first cup to the second cup containing the antibody solution. To the resultant solution was then added 10 µl of the solution of the spin label at a concentration of $3 \times 10^{-6}$ M.

A group of 65 samples was collected from the San Jose Methadone Clinic. The samples were all assayed by thin layer chromatography for methadone and 62 of the samples were found to be positive; one sample was reported to contain only a trace of methadone. The enzyme assay and the free radical assay were performed on the same day to minimize any effects which might occur in the urine on storage. Both the enzyme assay and the free radical assay showed 63 of the samples as positive. Cross-reactivity studies showed that thorazine and promethazine were detected to a much smaller extent than methadone. Demerol, prodine, dextromorphane, morphine, Darvon, hydromorphone, homatropine, phenobarbital, secobarbital, thiopental, glutethimide, and amphetamine went substantially undetected under the conditions of the assay at concentrations which gave almost 90 percent of the maximum rate for lysozyme activity with methadone.

The subject compounds and derivatives provide excellent reagents for use in immunoassays for detecting extremely minute quantities of methadone. Antigenic materials can be readily prepared and antibodies having the desired binding constants obtained. Substantial amounts of methadone can be coordinated with the antigenic protein, without loss of water solubility. Similarly, the methadone derivative can be conjugated to enzymes and the enzyme retain activity, but be inhibited when bound to antibody. The carboxylic acid can be readily derivatized to form a reactive carboxylic acid which can be bonded to a wide variety of amino compounds. High specificity is achieved so that there is little interference from other drugs having similar activity or similar conformations.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A compound of the formula:

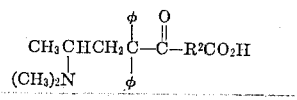

wherein $R^2$ is an alkylene group of from 4 to 8 carbon atoms, there being at least 4 carbon atoms between the two carbonyl groups and $\phi$ is phenyl.

2. A compound according to claim 1 wherein $R^2$ is straight chain hydrocarbon.

3. A compound of the formula:

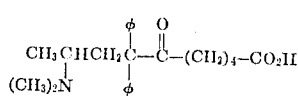

wherein $\phi$ is phenyl and its mineral acid salt.

4. A compound according to claim 3 as the mineral acid salt.

* * * * *